(12) United States Patent
Wang et al.

(10) Patent No.: US 12,234,989 B2
(45) Date of Patent: Feb. 25, 2025

(54) CENTRAL STAGED COMBUSTION CHAMBER WITH SELF-EXCITED SWEEPING OSCILLATING FUEL INJECTION NOZZLES

(71) Applicant: AERO ENGINE ACADEMY OF CHINA, Beijing (CN)

(72) Inventors: Shiqi Wang, Beijing (CN); Quan Wen, Beijing (CN); Xiao Han, Beijing (CN); Qian Yang, Beijing (CN)

(73) Assignee: AERO ENGINE ACADEMY OF CHINA, Beijing (CN)

( * ) Notice: Subject to any disclaimer, the term of this patent is extended or adjusted under 35 U.S.C. 154(b) by 0 days.

(21) Appl. No.: 18/541,041

(22) Filed: Dec. 15, 2023

(65) Prior Publication Data
US 2024/0328626 A1 Oct. 3, 2024

Related U.S. Application Data

(63) Continuation of application No. PCT/CN2022/071872, filed on Jan. 13, 2022.

(30) Foreign Application Priority Data

Jul. 2, 2021 (CN) .......................... 202110747716.8

(51) Int. Cl.
*F23R 3/34* (2006.01)
*F23R 3/14* (2006.01)
(Continued)

(52) U.S. Cl.
CPC ................ *F23R 3/346* (2013.01); *F23R 3/14* (2013.01); *F23R 3/286* (2013.01); *F23R 3/38* (2013.01)

(58) Field of Classification Search
CPC ...... F23R 3/12; F23R 3/14; F23R 3/28; F23R 3/286; F23R 3/30; F23R 3/343; F23R 3/346; F23R 3/38; B05B 1/08
See application file for complete search history.

(56) References Cited

U.S. PATENT DOCUMENTS

| 3,748,852 A * | 7/1973 | Cole .......................... F02K 9/52 |
| | | 60/725 |
| 4,151,955 A | 5/1979 | Stouffer |
| (Continued) | | |

FOREIGN PATENT DOCUMENTS

| CN | 104549805 A | 4/2015 |
| CN | 105180215 A | 12/2015 |
| (Continued) | | |

OTHER PUBLICATIONS

CN 202110747716.8 The First Office Action Mail Date May 7, 2022.
PCT/CN2022/071872 ISR.

*Primary Examiner* — William H Rodriguez
(74) *Attorney, Agent, or Firm* — IPRO, PLLC

(57) ABSTRACT

The present disclosure provides a central staged combustion chamber with self-excited sweeping oscillating fuel injection nozzles, including an outer housing with a cavity inside, a main stage coaxially disposed with the outer housing, and a pilot stage coaxially disposed with the outer housing. An annular fuel passage is used for connecting a plurality of self-excited sweeping oscillating fuel injection nozzles, and the self-excited sweeping oscillating fuel injection nozzles are suitable for injecting oscillating liquid fuel into a primary swirling passage. The fuel is output in a fan shape through each of the self-excited sweeping oscillating fuel injection nozzles and is dispersed by an incoming flow (Continued)

through the swirling passage, so that the atomization performance and spatial distribution uniformity of the fuel can be greatly improved.

9 Claims, 13 Drawing Sheets

(51) Int. Cl.
*F23R 3/28* (2006.01)
*F23R 3/38* (2006.01)

(56) References Cited

U.S. PATENT DOCUMENTS

| | | | | |
|---|---|---|---|---|
| 4,231,519 | A * | 11/1980 | Bauer | B05B 1/08 239/589.1 |
| 4,508,267 | A | 4/1985 | Stouffer | |
| 5,749,525 | A * | 5/1998 | Stouffer | B05B 1/08 239/284.1 |
| 5,827,976 | A * | 10/1998 | Stouffer | G01F 1/3227 385/13 |
| 5,971,301 | A * | 10/1999 | Stouffer | B05B 1/08 239/DIG. 3 |
| 7,111,800 | B2 | 9/2006 | Berning et al. | |
| 7,478,764 | B2 | 1/2009 | Gopalan | |
| 9,339,825 | B2 * | 5/2016 | Koklu | F15C 1/22 |
| 2010/0123031 | A1 * | 5/2010 | Weber | F15C 1/08 239/11 |
| 2013/0192237 | A1 * | 8/2013 | Oskam | F23R 3/286 60/746 |
| 2017/0219210 | A1 * | 8/2017 | Ogrowsky | F23R 3/28 |
| 2017/0254541 | A1 * | 9/2017 | Böttcher | F23R 3/20 |
| 2023/0392565 | A1 * | 12/2023 | Wang | F02K 3/10 |

FOREIGN PATENT DOCUMENTS

| | | |
|---|---|---|
| CN | 105435976 A | 3/2016 |
| CN | 107559881 A | 1/2018 |
| CN | 113464982 A | 10/2021 |
| CN | 215175236 U | 12/2021 |
| JP | 2002067888 A | 3/2002 |

* cited by examiner

CENTRAL STAGED COMBUSTION CHAMBER WITH SELF-EXCITED SWEEPING OSCILLATING FUEL INJECTION NOZZLES

FIELD OF THE INVENTION

The present disclosure relates to the technical field of central staged combustion chamber solutions of aero-engines, and in particular to the fuel injection and atomization technology of the main combustion chamber of gas turbines.

BACKGROUND OF THE INVENTION

The main demand for the combustion chamber of civil aviation engines is to reduce pollution emissions, and the main demand for the combustion chamber of military aviation engines is to increase the outlet temperature. The development trend of both combustion organizations is to use a central staged combustion chamber, that is, the center of each head of the combustion chamber is a pilot stage flame, and the surrounding is a main stage flame, as shown in FIG. 1. The pilot stage generally includes a centrifugal pressure nozzle and one or a pair of radial swirlers, which are used to improve the atomization performance of fuel and form a non-premixed flame. The pilot stage is mainly used to stabilize the flame under various engine conditions. The main stage contains an axial swirler and a series of direct fuel injection holes uniformly distributed in the circumferential direction. The fuel of the main stage is mixed with swirling air in an annular channel to complete the process of premixing and pre-evaporation, and then enters a flame tube to form the main stage flame.

Main pollutant emissions of aero-engines include: nitrogen oxides (NOx), carbon monoxide (CO), unburned hydrocarbons (UHC), smoke, and the like. In the main pollutant emissions, the main consideration is to reduce the emission of nitrogen oxides. Nitrogen oxides (NOx) are mainly controlled by thermal mechanisms, and high combustion zone temperatures can cause a sharp increase in NOx emissions. Therefore, the key to the design of low-emission combustion chamber is to reduce the equivalence ratio of head combustion zone, while improving the uniformity of oil-gas mixture and avoiding local high temperature zones. To sum up, one of the core technologies of modern low-emission combustion chambers is rapid and uniform fuel mixing, thereby providing a more uniform oil-gas mixture for the flame tube.

For military high-temperature combustion chambers, the biggest technical challenge is to improve the uniformity of temperature distribution at the outlet of the combustion chamber, so as to reduce the impact of high-temperature gas on turbine blades and improve the engine life. In order to improve the uniformity of outlet temperature distribution and reduce the local high temperature area, it is also necessary to improve the uniformity of oil-gas mixing in the main stage.

Therefore, the mixing of fuel of the main stage is the key to determine the combustion chamber emission and outlet temperature distribution. At present, several well-known aero-engine combustion chambers basically adopt direct injection holes with simple circular holes, which mainly use the shear effect of direct liquid column generated by circular hole nozzles and transverse airflow to break and atomize the fuel, such as radial wall injection with auxiliary air accompanying flow, radial wall injection with pre-film plate and pre-film injection. Pre-film spraying has problems of complex structure and difficult implementation on large nozzles. In the first two wall radial injection solutions, the penetration depth of fuel is controlled by the momentum ratio. Under large working conditions, the penetration depth is large, and the mixing of fuel and main stage swirl is stronger, but the radial distribution uniformity is still not good enough. However, under small working conditions, the fuel flow is small and the momentum ratio is low, which often leads to insufficient penetration depth and affects fuel mixing. In addition, part of the fuel is easy to adhere to the inner wall of the channel, causing coking or auto-ignition and flashback. Therefore, at present, the existing fuel injection mainly adopts simple circular hole direct nozzles, and there is still a lot of room for improving the mixing uniformity of the fuel.

SUMMARY OF THE INVENTION

In order to solve at least one of the above technical problems, the present disclosure provides a central staged combustion chamber with self-excited sweeping oscillating fuel injection nozzles. A circle of fan-shaped nozzles surrounding the main stage are designed with different flow rates, different oil mist angles, different sweeping frequencies, or the like, to obtain better fuel mixing effects and suppress combustion instability. The purpose of the present disclosure can be achieved by the following solutions.

On the one hand, the present disclosure provides a central staged combustion chamber with self-excited sweeping oscillating fuel injection nozzles, including: an outer housing with a cavity inside, a main stage coaxially disposed with the outer housing, and a pilot stage coaxially disposed with the outer housing, wherein the main stage is disposed inside the outer housing, a main stage swirler is disposed between a main body of the main stage and an inner wall surface of the outer housing to form a primary swirling passage, an annular fuel passage is also disposed inside the main body of the main stage, and the fuel passage is suitable for being connected with an oil pipeline; the main body is provided with a plurality of self-excited sweeping oscillating fuel injection nozzles communicated with the fuel passage in a direction facing away from a direction of an incoming flow, and the self-excited sweeping oscillating fuel injection nozzles are suitable for injecting oscillating liquid fuel into the primary swirling passage. The pilot stage includes one or two groups of swirlers capable of rotating the incoming flow through the pilot stage.

Further, the pilot stage includes a secondary swirler and a central swirler, and the secondary swirler and the central swirler make the incoming flow through the pilot stage form two swirling flows having an opposite direction of rotation.

Further, each of the self-excited sweeping oscillating fuel injection nozzles includes a contracted opening, an oscillating chamber and a spout, wherein the contracted opening is communicated with the fuel passage through an oil guiding hole, the fuel enters the self-excited sweeping oscillating fuel injection nozzle from the oil guiding hole, and accelerates into the oscillating chamber after passing through the contracted opening, the contracted opening is connected with one end of the oscillating chamber, and the spout is connected with the other end of the oscillating chamber; and two blocking bodies are symmetrically disposed in the oscillating chamber with a line connecting a central point of the contracted opening and a central point of the spout as an axis of symmetry, and the two blocking bodies separate the oscillating chamber into a fuel oscillating part located in the middle part and two fuel backflow parts distributed on both sides.

Further, the main stage includes an outer interstage section and an inner interstage section, wherein the outer interstage section includes a circular housing, the main stage swirler disposed on an outer side of the circular housing, and an oil guiding flange disposed at one end of the circular housing and extending to an axis of the circular housing; the oil guiding flange is provided with the plurality of self-excited sweeping oscillating fuel injection nozzles in the direction facing away from the direction of an incoming flow, and the oil guiding flange is also provided with a plurality of oil guiding holes corresponding to the plurality of self-excited sweeping oscillating fuel injection nozzles; and a maximum outer diameter of the inner interstage section is smaller than an inner diameter of the circular housing, and an end of the inner interstage section is suitable for abutting with the oil guiding flange, so as to form the circular-ring-shaped fuel passage communicated with the plurality of oil guiding holes.

Further, the self-excited sweeping oscillating fuel injection nozzle is a groove disposed on a surface of the oil guiding flange facing away from the direction of the incoming flow, the pilot stage is provided with a circular-ring-shaped first shutter, and the circular-ring-shaped first shutter is suitable for closing an opening of the groove facing away from the direction of the incoming flow.

Further, the pilot stage includes a pilot stage fuel injection device, and the pilot stage fuel injection device includes a pilot stage fuel injection nozzle, a central swirler, and a fuel injection nozzle mounting ring used for connecting the pilot stage fuel injection nozzle to the middle part of the central swirler.

Further, the pilot stage includes a front-end swirling part, and the front-end swirling part includes the first shutter, a boss located on a surface of the first shutter and facing the direction of the incoming flow, and a secondary swirler located on a surface of the boss and facing the direction of the incoming flow.

Further, the pilot stage fuel injection device includes a positioning face used for abutting with the secondary swirler, and the central swirler is disposed on a side of the positioning face away from the secondary swirler.

Further, the secondary swirler and the central swirler present a helical tooth shape, and the secondary swirler and the central swirler guide the incoming flow to an axis of the central staged combustion chamber.

Further, the central staged combustion chamber with self-excited sweeping oscillating fuel injection nozzles further includes a second shutter used for closing an annular opening of the fuel passage facing the direction of the incoming flow; the second shutter is provided with a notch suitable for being connected with the oil pipeline, and the liquid fuel of the oil pipeline is suitable for entering the fuel passage through the notch.

Further, the central staged combustion chamber with self-excited sweeping oscillating fuel injection nozzles further includes an oil pipeline communicated with the fuel passage of the main stage through a joint.

Compared with the prior art, the advantages of the present disclosure lie in: the present disclosure provides a central staged combustion chamber with self-excited sweeping oscillating fuel injection nozzles, including an outer housing with a cavity inside, a main stage coaxially disposed with the outer housing, and a pilot stage coaxially disposed with the outer housing. An annular fuel passage is used for connecting a plurality of self-excited sweeping oscillating fuel injection nozzles, and the self-excited sweeping oscillating fuel injection nozzles are suitable for injecting oscillating liquid fuel into a primary swirling passage. The fuel is output in a fan shape through each of the self-excited sweeping oscillating fuel injection nozzles and is dispersed by an incoming flow through the swirling passage, so that the atomization performance and spatial distribution uniformity of the fuel can be greatly improved. Meanwhile, since the self-excited sweeping oscillating fuel injection nozzles suitable for outputting the oscillating liquid fuel need to have a complex cavity structure, if the original oil circuit is adopted, the structural complexity of the central staged combustion chamber will be increased inevitably. Therefore, in the present disclosure, the annular fuel passage is also disposed inside the main body of the main stage, and the fuel passage is connected with an oil pipeline and communicated with the self-excited sweeping oscillating fuel injection nozzle, so that the compact and miniaturized structural design can be achieved.

BRIEF DESCRIPTION OF DRAWINGS

The accompanying drawings illustrate exemplary embodiments of the present disclosure and are used to explain the principles of the present disclosure in conjunction with corresponding description, the accompanying drawings provide a further understanding of the present disclosure and are incorporated in and constitute a part of this specification.

Figure 1:
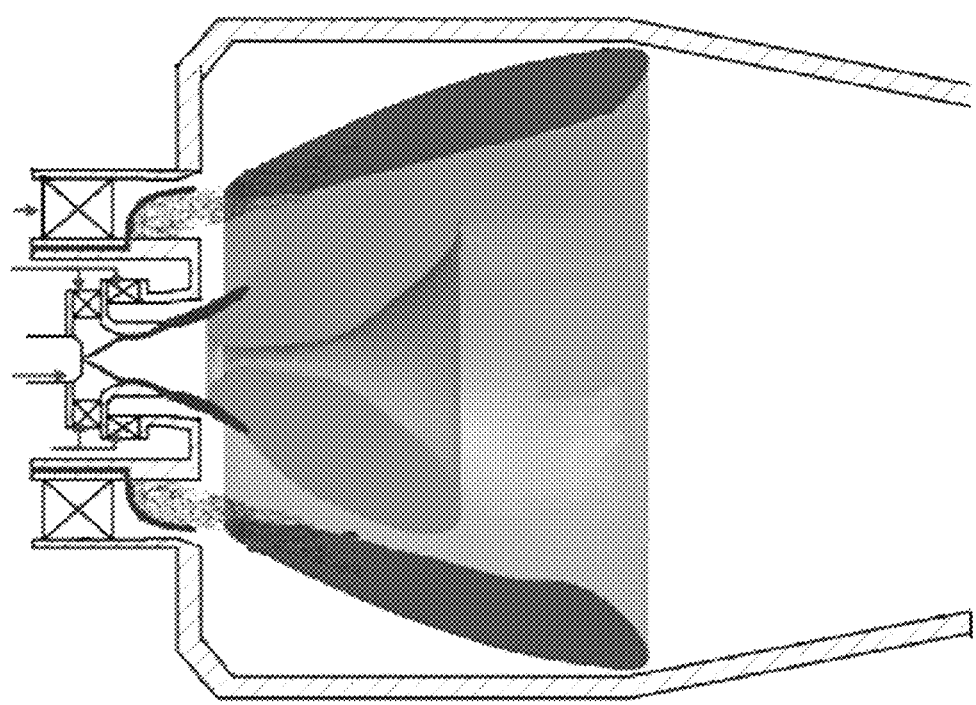
FIG. 1 is a schematic diagram of a conventional central staged combustion chamber.

Wherein, 1—oil pipeline, 2—outer housing, 3—front-end swirling part, 31—first shutter, 32—boss, 33—secondary swirler, 4—outer interstage section, 41—circular housing, 42—main stage swirler, 43—oil guiding flange, 44—oil guiding hole, 45—self-excited sweeping oscillating fuel injection nozzle, 451—contracted opening, 452—oscillating chamber, 453—spout, 454—blocking body, 455—fuel backflow part, 5—inner interstage section, 6—pilot stage fuel injection device, 61—pilot stage fuel injection nozzle, 62—positioning face, 63—central swirler, 64—guiding body, 65—fuel injection nozzle mounting ring, 7—second shutter, 81—fuel passage, 91—first incoming flow, 92—second incoming flow, 93—third incoming flow.

DETAILED DESCRIPTION OF THE INVENTION

The present disclosure will be clearly and completely described below with reference to the accompanying drawings and specific embodiments. It can be understood that the embodiments described here are only used to illustrate relative contents rather than limiting the scope of the present disclosure. In addition, it should also be noted that, only the parts related to the present disclosure are shown in the drawings for the convenience of description.

It should be noted that the embodiments of the present disclosure and the features of the embodiments may be combined with each other if there is no conflict. The present disclosure will be described in detail below with reference to the accompanying drawings in conjunction with the embodiments.

Figure 2:
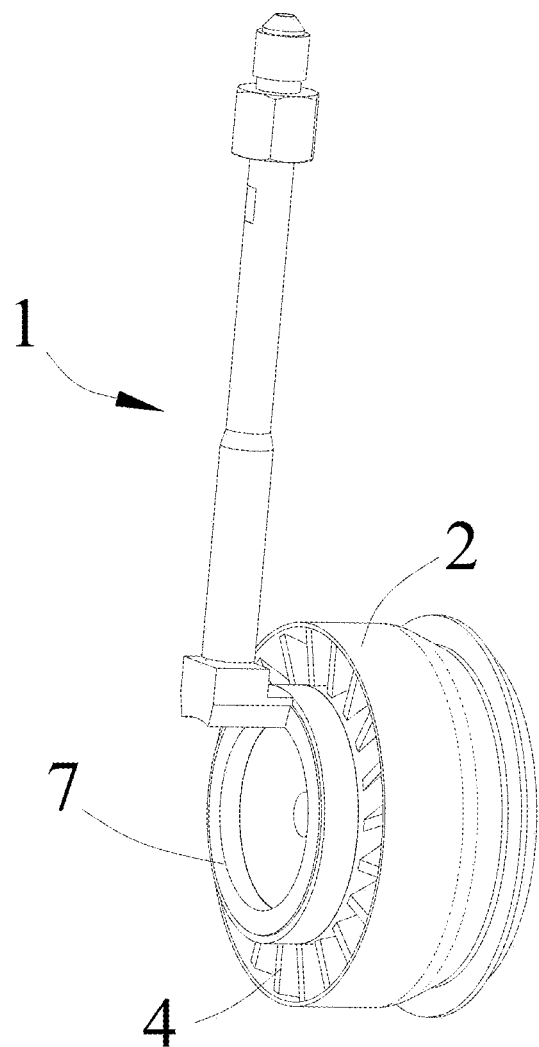
FIG. 2 is a schematic diagram of a central staged combustion chamber with self-excited sweeping oscillating fuel injection nozzles of the present disclosure.
Figure 3:
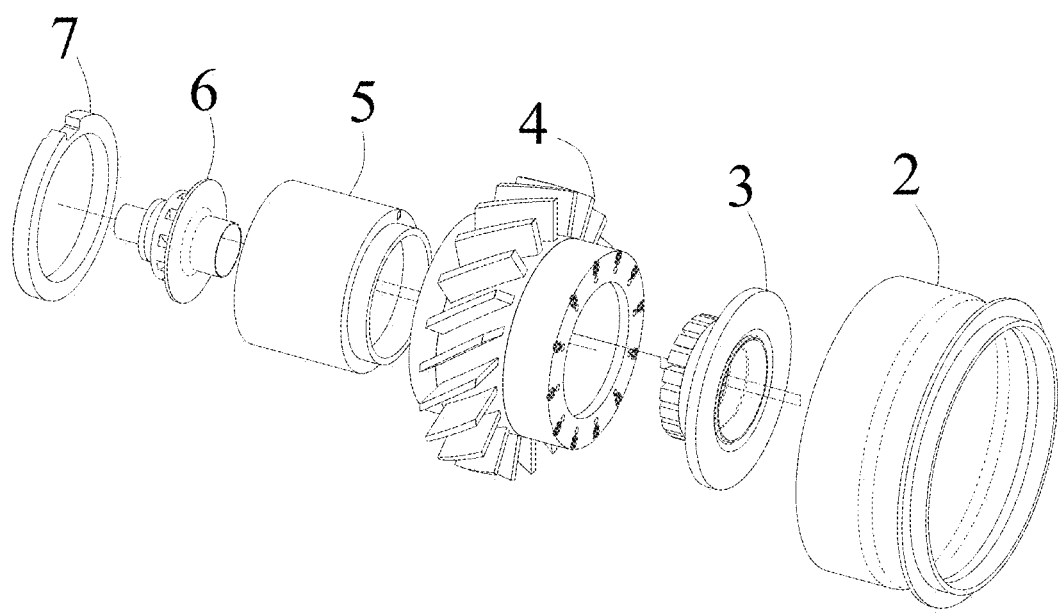
FIG. 3 is a schematic explosion diagram of the central staged combustion chamber in FIG. 2.

Referring to FIG. 2 and FIG. 3, the present disclosure provides a central staged combustion chamber with self-excited sweeping oscillating fuel injection nozzles 45. In terms of functions, the central staged combustion chamber mainly includes an oil pipeline 1, an outer housing 2, a main stage and a pilot stage. In terms of specific structures, the main stage includes an outer interstage section 4, an inner interstage section 5 and a second shutter 7; and the pilot stage includes a front-end swirling part 3 and a pilot stage fuel injection device 6. As can be seen from FIG. 3, the outer housing 2, the front-end swirling part 3, the outer interstage section 4, the inner interstage section 5, the pilot stage fuel injection device 6 and the second shutter 7 are nested in sequence or connected to form the central staged combustion chamber in FIG. 2.

Figure 4:
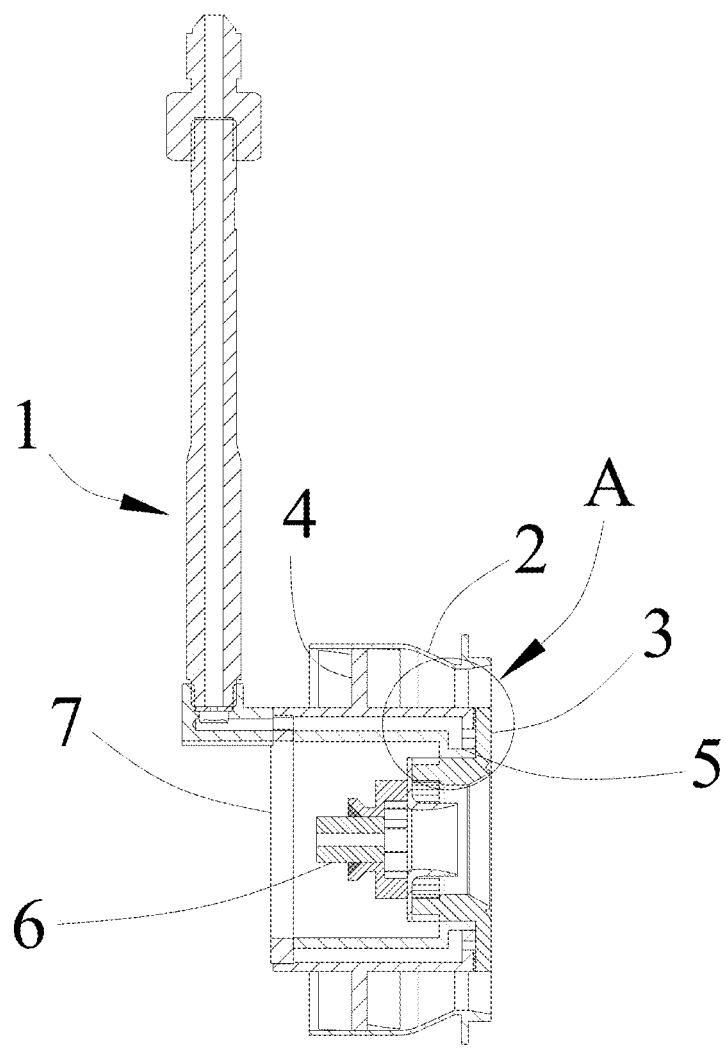
FIG. 4 is a schematic cross-sectional view of the central staged combustion chamber in FIG. 2 along a plane of symmetry.

Firstly, the solutions of the present disclosure are explained in terms of functional partitioning. Referring to FIG. 4, the outer housing 2 presents a sleeve shape with a penetrating cavity inside. Preferably, the outer housing 2 is rotationally symmetrical with its central axis. A diameter of the outer housing 2 in a direction of facing a direction of an incoming flow is larger than a diameter of the outer housing 2 in a direction of facing away from the direction of the incoming flow, so that the outer housing 2 can improve the flow speed of the incoming flow to a certain extent.

Figure 12:
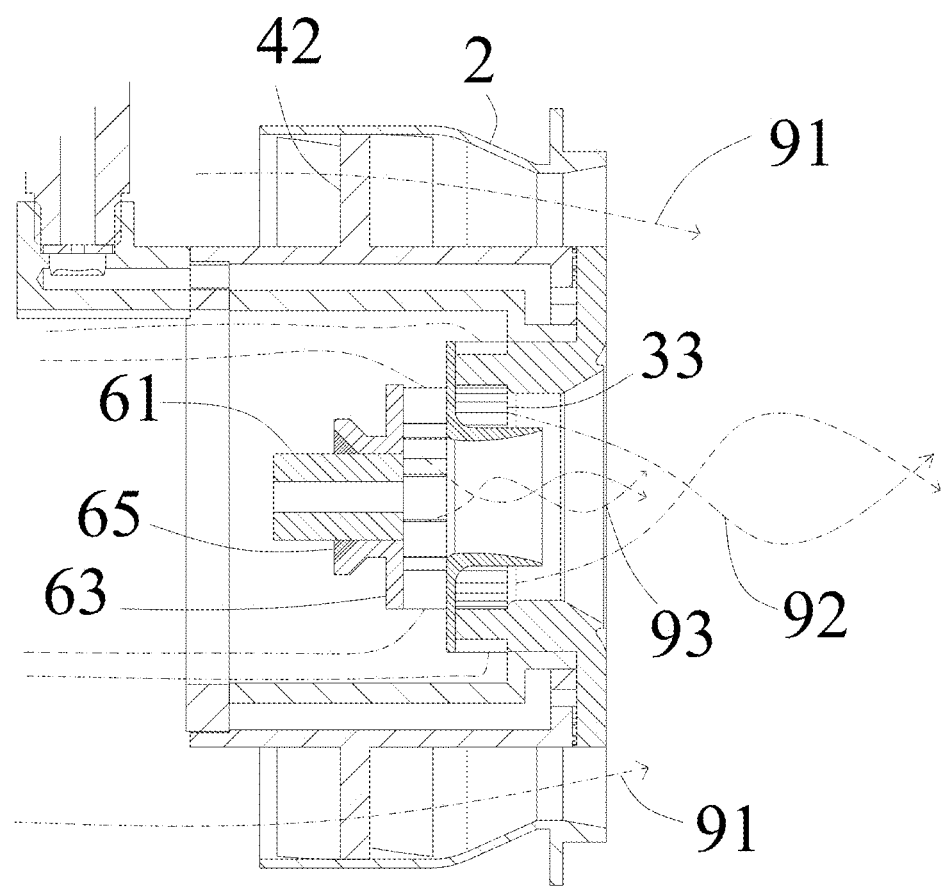
FIG. 12 is a schematic diagram of airflow passing through the central staged combustion chamber in FIG. 2.

The main stage and the pilot stage are coaxial with the outer housing 2, that is, the main stage and the pilot stage are coaxial with the central axis. A diameter of a main body of the main stage is smaller than an inner diameter of the outer housing 2, so that a primary swirling passage is defined between the surface of the main body of the main stage and an inner wall surface of the outer housing 2. The main stage also includes a main stage swirler 42 suitable for being disposed in the primary swirling passage. Referring to FIG. 12, a first incoming flow 91 is capable of rotating in a first direction after passing through the main stage swirler 42.

Figure 5:
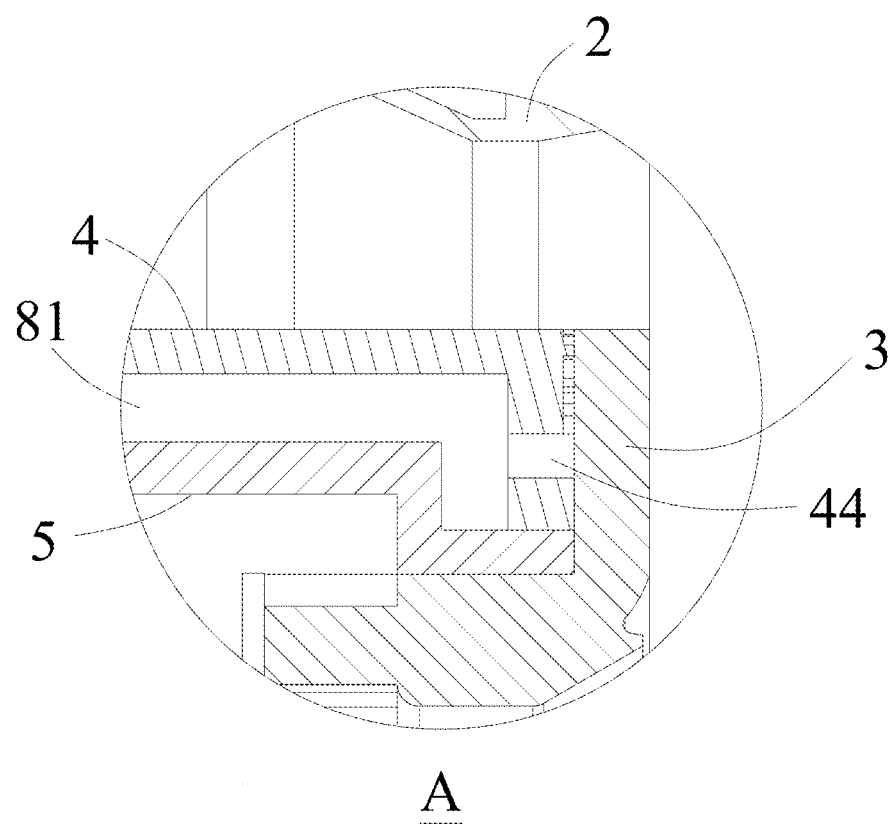
FIG. 5 is an enlarged schematic diagram at A in FIG. 4.

Referring to FIG. 5, an annular fuel passage 81 is also disposed inside the main body of the main stage. Specifically, the inner wall and an outer wall of the main body are disposed at intervals to form a sandwich structure, and a space in the middle part is the fuel passage 81. A plurality of self-excited sweeping oscillating fuel injection nozzles 45 are disposed on the side of the main body in the direction facing away from the direction of the incoming flow. Preferably, the plurality of self-excited sweeping oscillating fuel injection nozzles 45 are uniformly disposed along a circumferential direction of the axis. One end of the fuel passage 81 should be connected with the oil pipeline 1, and the other end should be connected with the plurality of self-excited sweeping oscillating fuel injection nozzles 45. Therefore, after entering the fuel passage 81, the liquid fuel in the oil pipeline 1 quickly fills the whole passage along the annular fuel passage 81, and uniformly enters the self-excited sweeping oscillating fuel injection nozzles 45 from a connection between the fuel passage 81 with the self-excited sweeping oscillating fuel injection nozzles 45.

The self-excited sweeping oscillating fuel injection nozzles 45 are suitable for injecting oscillating liquid fuel into the primary swirling passage. The high-speed swirling flow generated at the rear of the main stage swirler 42 can quickly disperse the liquid fuel after encountering the fan-shaped liquid fuel generated by the self-excited sweeping oscillating fuel injection nozzles 45. In order to further mix the liquid fuel and gas, the pilot stage usually includes a swirler that rotates the incoming flow, so that the liquid fuel and the gas of the incoming flow can be further mixed.

Referring to FIG. 12, the pilot stage includes a secondary swirler 33 and a central swirler 63. A second incoming flow 92 rotates in a second direction after entering the secondary swirler 33. A third incoming flow 93 rotates in a third direction after entering the central swirler 63. When the second direction and the third direction are opposite, air can be further mixed with the liquid fuel of the pilot stage.

Figure 9:
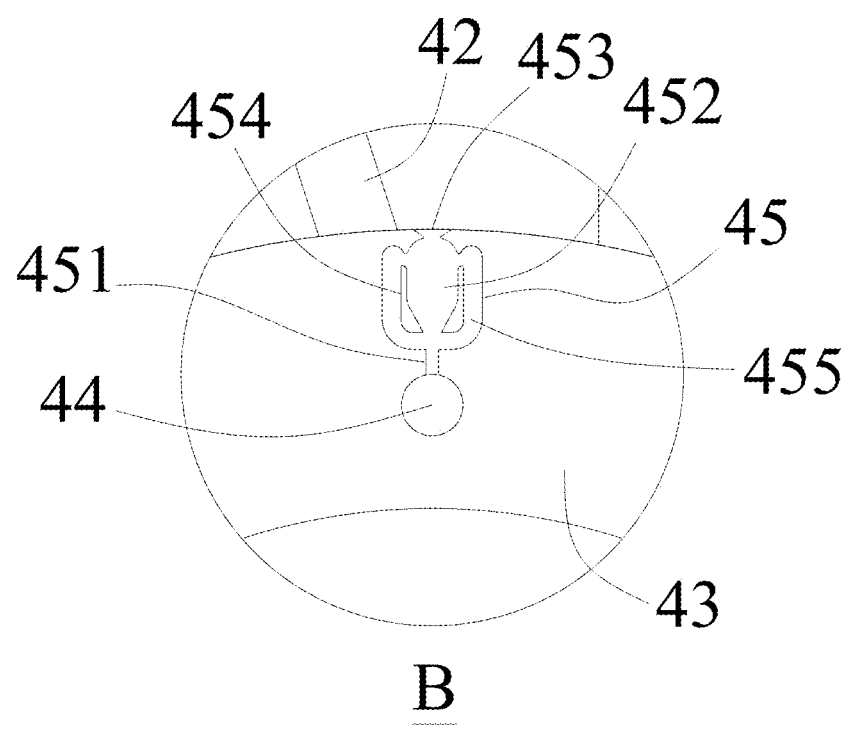
FIG. 9 is an enlarged schematic diagram at B in FIG. 8.

Referring to FIG. 9, each of the self-excited sweeping oscillating fuel injection nozzles 45 includes a contracted opening 451, an oscillating chamber 452 and a spout 453. The contracted opening 451 is communicated with the fuel passage 81 through an oil guiding hole 44, and the fuel enters the self-excited sweeping oscillating fuel injection nozzle 45 from the oil guiding hole 44, and accelerates into the oscillating chamber 452 after passing through the contracted opening 451. The contracted opening 451 is connected with one end of the oscillating chamber 452, and the spout 453 is connected with the other end of the oscillating chamber 452.

Two blocking bodies 454 are symmetrically disposed in the oscillating chamber 452 with a line connecting a central point of the contracted opening 451 and a central point of the spout 453 as an axis of symmetry, and the two blocking bodies 454 separate the oscillating chamber 452 into a fuel oscillating part located in the middle part and two fuel backflow parts 455 distributed on both sides. The fuel backflow parts 455 form a feedback channel. Each of the blocking bodies 454 presents an "L" shape, and two right-angled sides of the blocking body 454 and two side walls of the oscillating chamber 452 form the fuel backflow part 455. A bottom edge of the "L" shape is close to the contracted opening 451. When passing through the blocking body 454, the fuel diffuses towards a vertical edge of the blocking body 454 and forms a vortex. Vortices on both sides are difficult to be exactly the same, therefore, there must be a vortex with relatively strong rotation, causing a main fuel to deflect to one side of the vortex with relatively strong rotation, and further strengthening the strength of the vortex on the side, while weakening the strength of the vortex on the other side. Meanwhile, since the main fuel flows close to one side, a pressure at an outlet of the fuel backflow part 455 near the side is relatively low. When the main fuel passes through an inlet of the fuel backflow part 455, more liquid fuel flows from the inlet of the fuel backflow part 455 to the outlet of the fuel backflow part 455 due to a pressure difference, the pressure of the outlet is compensated to push the main fuel at the outlet away from the vortex. When the main fuel deflects to the other side by a large angle, the vortex on the other side has an advantage in rotational strength, so that the main fuel is quickly attracted and deflected to the other side. By repeating the above processes, high-frequency oscillating jets are output at the spout 453.

The spout 453 is connected with the oscillating chamber 452 through a throat hole. Specifically, by setting the throat hole, the fluid diffused in the oscillating chamber 452 can be contracted. Since the main fluid has deviated in the oscillating chamber 452, the jet emitted from the throat hole will continue the direction of the main fluid in the oscillating chamber 452. An outer end of the spout 453 is larger than a connecting end connecting the spout 453 with the throat hole, specifically, a trumpet-shaped opening is formed. Consistent with the spout 453, the trumpet-shaped opening can increase a space applied for the airflow to swing.

Figure 10A:
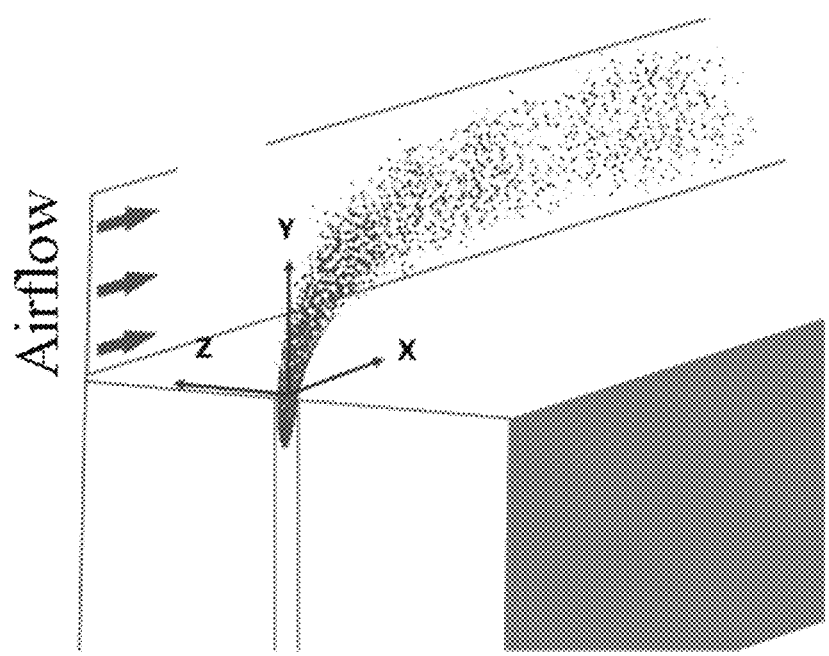
FIG. 10A is a schematic diagram of fuel injection by a plain-orifice injection nozzle.
Figure 10B:
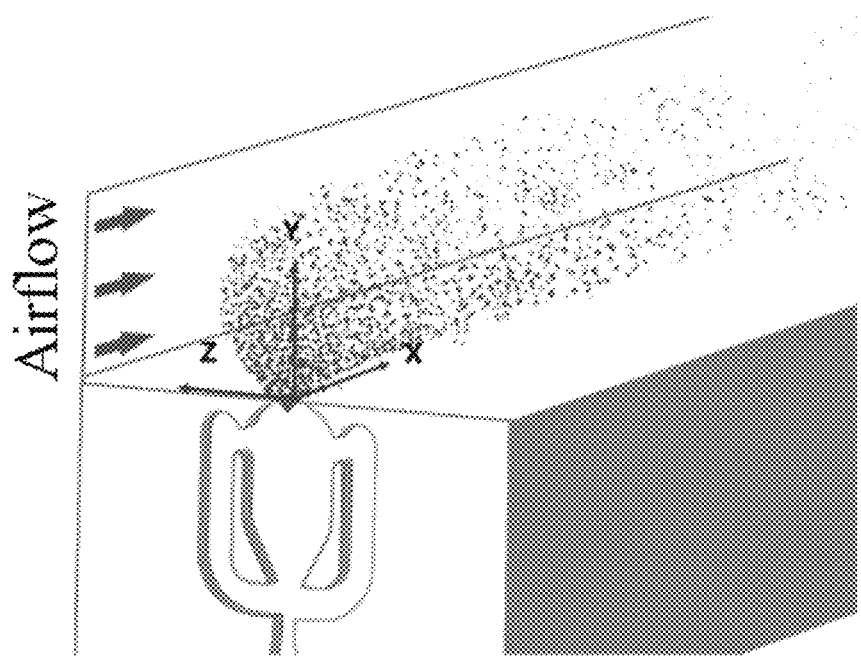
FIG. 10B is a schematic diagram of fuel injection by the self-excited sweeping oscillating fuel injection nozzle.

Generally, the uniformity of fuel and air mixing will determine the adequacy and quality of combustion. The self-excited sweeping oscillating fuel injection nozzles 45 can spread the fuel in a large space and evenly mix it with the air under the action of the high-speed transverse airflow, thereby effectively improve the combustion efficiency. The use of direct fuel atomization leads to a low fuel injection efficiency (FIG. 10A), and the use of sweeping fuel injection usually requires to introduce a mechanical control structure or an electromagnetic control mechanism, which increases the complexity of the engine. The present disclosure creatively introduces a self-excited sweeping oscillating fuel injection nozzle 45 with a self-excited sweeping-type oscillation. Under the injection of high-pressure liquid fuel, the self-excited oscillation chamber is used to generate high-frequency sweeping-type oscillating liquid fuel output (FIG. 10B), such that mechanical kinematic structures or electromagnetic structures are not needed.

Referring to FIG. 3, in order to facilitate machining and assembly, the main stage also includes an outer interstage section 4, an inner interstage section 5 and a second shutter 7, and the pilot stage also includes a front-end swirling part 3 and a pilot stage fuel injection device 6.

Figure 7:
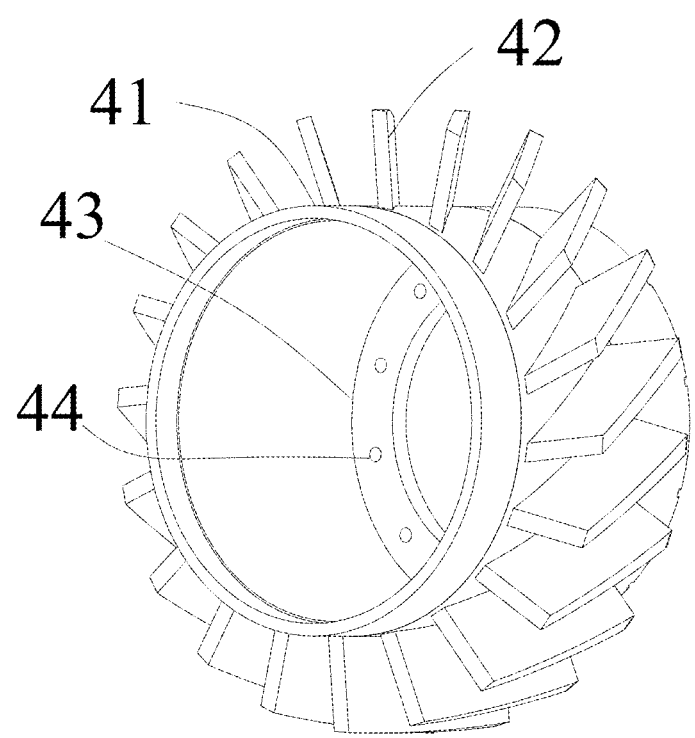
FIG. 7 is a detailed schematic diagram of an outer interstage section in FIG. 3.
Figure 8:
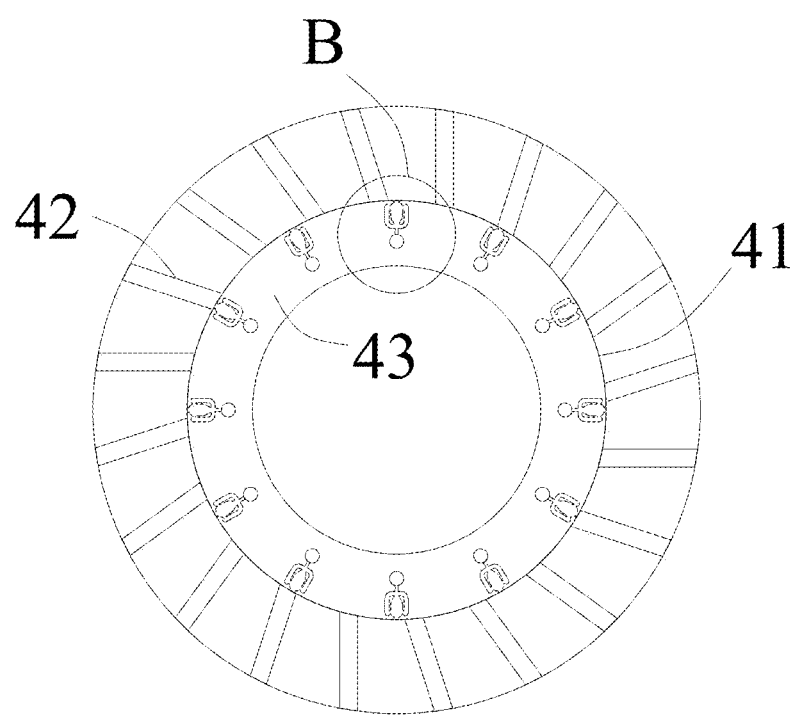
FIG. 8 is a front view of the outer interstage section in FIG. 7.

Referring to FIG. 7 and FIG. 8, the outer interstage section 4 includes a circular housing 41, the a main stage swirler 42 disposed on an outer side of the circular housing 41, and an oil guiding flange 43 disposed at one end of the circular housing 41 and extending to an axis of the circular housing 41. Since the above structure is relatively simple, the structural member can be obtained directly by casting and machining. Meanwhile, in the direction of the oil guiding flange 43 away from the incoming flow, the self-excited sweeping oscillating fuel injection nozzle 45 can be directly machined on the surface according to the shape by milling, and the self-excited sweeping oscillating fuel injection nozzle 45 presents a groove. Oil guiding holes 44 corresponding to the number of self-excited sweeping oscillating fuel injection nozzles 45 are formed at the ends of the self-excited sweeping oscillating fuel injection nozzles 45 by a drilling machine.

Referring to FIG. 3, the purpose of the inner interstage section 5 is to form the inner wall surface of the main stage, which does not need other auxiliary functional structures, thereby having a regular and cylindrical main structure. A maximum outer diameter of the inner interstage section 5 is smaller than an inner diameter of the circular housing 41, and an end of the inner interstage section 5 is suitable for abutting with the oil guiding flange 43, thereby forming a circular-ring-shaped fuel passage 81 communicated with the plurality of oil guiding holes 44.

Further, a longitudinal direction of the self-excited sweeping oscillating fuel injection nozzle 45 is radially distributed along the oil guiding flange 43, and the oil guiding hole 44 need to be disposed at the end of the self-excited sweeping oscillating fuel injection nozzle 45. In order to ensure the rapid distribution of liquid fuel, a diameter of a main body of the inner interstage section 5 is larger than a diameter of a contact part between the inner interstage section 5 and the oil guiding flange 43, thereby forming a step shape.

Figure 6:
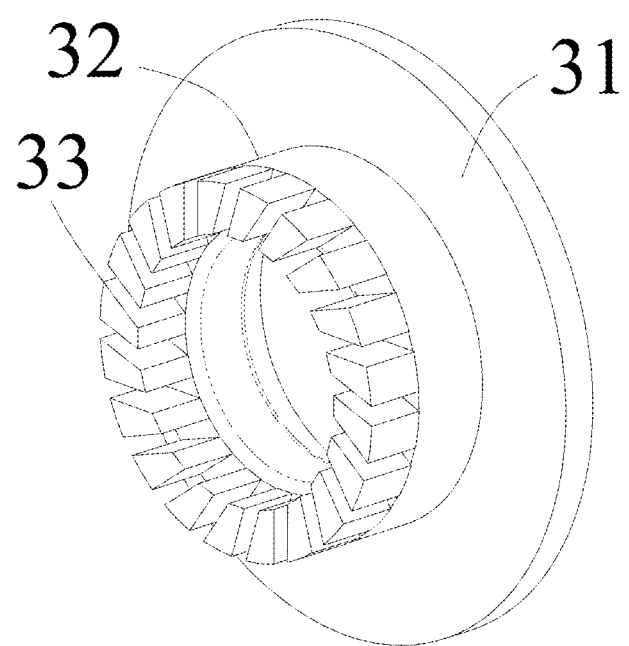
FIG. 6 is a detailed schematic diagram of a front-end swirling part in FIG. 3.

Referring to FIG. 6, the front-end swirling part 3 includes the first shutter 31, a boss 32 located on a surface of the first shutter 31 and facing the direction of the incoming flow, and a secondary swirler 33 located on a surface of the boss 32 and facing the direction of the incoming flow. Referring to FIG. 5, the first shutter 31 is suitable for closing an opening of the groove facing away from the direction of the incoming flow, so that the liquid fuel can only enter the self-excited sweeping oscillating fuel injection nozzle 45 through the oil guiding hole 44 and be ejected from the spout 453 of the self-excited sweeping oscillating fuel injection nozzle 45.

It is worth noting that the first shutter 31, the boss 32 and the secondary swirler 33 are all circular-ring-shaped channels. The middle part of the circular-ring-shaped channels is an accommodating structure, so that the airflow of the secondary swirler 33 and the central swirler 63 can pass smoothly. The secondary swirler 33 is machined by a milling machine to form a helical tooth structure, thereby guiding the direction of airflow rotation.

Figure 11:
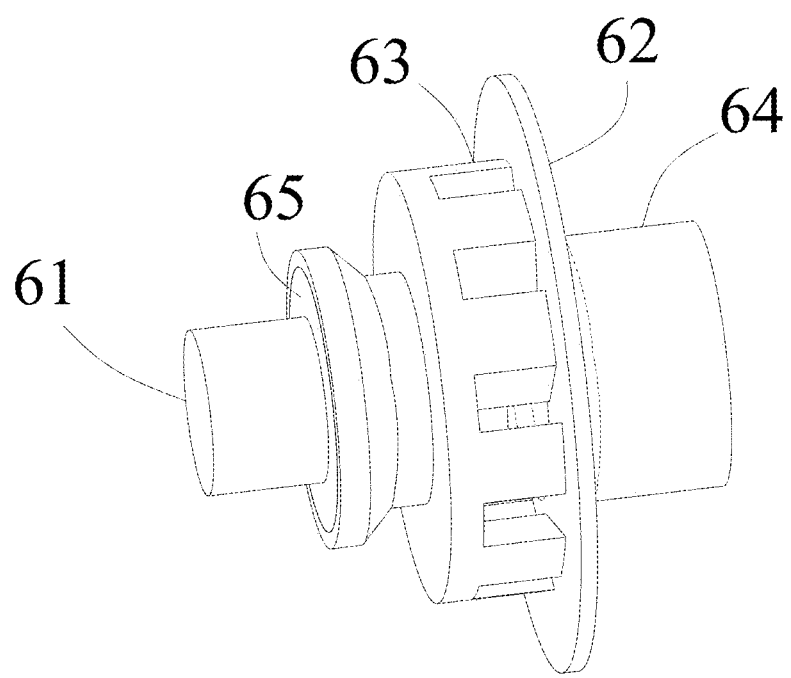
FIG. 11 is a detailed schematic diagram of a pilot stage fuel injection device in FIG. 3.

Referring to FIG. 11, the pilot stage fuel injection device 6 includes a positioning face 62 used for abutting with the secondary swirler 33, a central swirler 63 disposed on a side of the positioning face 62 away from the secondary swirler 33, a pilot stage fuel injection nozzle 61 located on the side of the central swirler 63 facing the direction of the flow direction, and a guiding body 64. Specifically, the pilot stage fuel injection nozzle 61 is connected with the central swirler 63 through a fuel injection nozzle mounting ring 65. The pilot stage fuel injection nozzle 61 is connected with another oil pipeline in the direction facing the direction of the incoming flow, and the liquid fuel is injected into the middle part of the central swirler 63 through a middle through hole of the pilot stage fuel injection nozzle 61. The liquid fuel injected by the pilot stage fuel injection nozzle 61 will be fully dispersed and mixed when encountering the rotating airflow output by the central swirler 63.

The central swirler 63 and the guiding body 64 are located on two sides of the positioning face 62. The central swirler 63, the positioning face 62 and the guiding body 64 are all circular-ring-shaped structures. The helical tooth structure on the central swirler 63 is obtained by milling. The incoming flow converges towards the center of the central swirler 63 after passing through the central swirler 63, and flows to the end of the central staged combustion chamber through the guiding body 64. The guiding body 64 can first separate rotating airflows generated by the secondary swirler 33 and the central swirler 63, when the two rotating airflows rotate stably and then collide and mix together, the mixing degree of liquid fuel and air is further improved.

Referring to FIG. 3, the second shutter 7 is provided with a notch suitable for being connected with the oil pipeline 1, and the liquid fuel of the oil pipeline 1 is suitable for entering the fuel passage 81 through the notch. The oil pipeline 1 communicates with the fuel passage 81 of the main stage through a joint.

In the present disclosure, the fuel is output in a fan shape through each of the self-excited sweeping oscillating fuel injection nozzles 45 and is dispersed by an incoming flow through the swirling passage, so that the atomization performance and spatial distribution uniformity of the fuel can be greatly improved. Meanwhile, since the self-excited sweeping oscillating fuel injection nozzles 45 suitable for outputting the oscillating liquid fuel need to have a complex cavity structure, if the original oil circuit is adopted, the structural complexity of the central staged combustion chamber will be increased inevitably. In the present disclosure, from the point of view of manufacturing, components of the central staged combustion chamber are decomposed into a plurality of modules which are easy to process, so that the fuel passage 81 can be connected with the oil pipeline 1 and communicated with the self-excited sweeping oscillating fuel injection nozzles 45, without increasing the complexity of the system. Compared with the existing central staged combustion chamber, the central staged combustion chamber of the present disclosure also has the characteristics of compact structure and miniaturization.

In the description of this specification, the description with reference to the terms such as "one embodiment/mode", "some embodiments/mode", "example", "specific example", or "some examples" means that specific features, structures, materials or characteristics described in connection with the embodiment/mode or example are included in at least one embodiment/mode of the present disclosure. In this specification, the schematic representations of the above terms are not necessarily directed to the same embodiment/mode or example. Moreover, the specific features, structures, materials or characteristics described may be combined in any one or more embodiments/modes or examples in a suitable way. In addition, those skilled in the art can combine or integrate different embodiments/modes or examples described in this specification and the features of different embodiments/modes or examples if there is no conflict.

In addition, the terms "first" and "second" are only used for descriptive purposes, and should not be considered as indicating or implying relative importance or implying the number of indicated technical features. Thus, a feature delimited with "first", "second" may expressly or implicitly include at least one of those features. In the description of the present disclosure, "plurality" means at least two, such as two, three, unless expressly and specifically defined otherwise.

Those skilled in the art should understand that the above embodiments are only for clearly illustrating the present disclosure, rather than limiting the scope of the present disclosure. For those skilled in the art, other changes or modifications may also be made on the basis of the above disclosure, and these changes or modifications are still within the scope of the present disclosure.

The invention claimed is:

1. A central staged combustion chamber with self-excited sweeping oscillating fuel injection nozzles, comprising: an outer housing with a cavity inside, a main stage coaxially disposed with the outer housing, and a pilot stage coaxially disposed with the outer housing, wherein
the main stage is disposed inside the outer housing, a main stage swirler is disposed between a main body of the main stage and an inner wall surface of the outer housing to form a primary swirling passage, an annular fuel passage is also disposed inside the main body of the main stage, and the fuel passage is suitable for being connected with an oil pipeline; the main body is provided with a plurality of self-excited sweeping oscillating fuel injection nozzles communicated with the fuel passage in a direction facing away from a direction of an incoming flow, and the self-excited sweeping oscillating fuel injection nozzles are suitable for injecting oscillating liquid fuel into the primary swirling passage,
wherein the main stage comprises an outer interstage section and an inner interstage section, wherein
the outer interstage section comprises a circular housing, the main stage swirler disposed on an outer side of the circular housing, and an oil guiding flange disposed at one end of the circular housing and extending to an axis of the circular housing; the oil guiding flange is provided with the plurality of self-excited sweeping oscillating fuel injection nozzles in the direction facing away from the direction of an incoming flow, and the oil guiding flange is also provided with a plurality of oil guiding holes corresponding to the plurality of self-excited sweeping oscillating fuel injection nozzles; and
a maximum outer diameter of the inner interstage section is smaller than an inner diameter of the circular housing, and an end of the inner interstage section is suitable for abutting with the oil guiding flange, so as to form the circular-ring-shaped fuel passage communicated with the plurality of oil guiding holes.

2. The central staged combustion chamber with self-excited sweeping oscillating fuel injection nozzles according to claim 1, wherein the pilot stage comprises one or two groups of swirlers capable of rotating the incoming flow through the pilot stage.

3. The central staged combustion chamber with self-excited sweeping oscillating fuel injection nozzles according to claim 2, wherein the pilot stage comprises a secondary swirler and a central swirler, and the secondary swirler and the central swirler make the incoming flow through the pilot stage form two swirling flows having an opposite direction of rotation.

4. The central staged combustion chamber with self-excited sweeping oscillating fuel injection nozzles according to claim 1, wherein each of the self-excited sweeping oscillating fuel injection nozzles comprises a contracted opening, an oscillating chamber and a spout, wherein
the contracted opening is communicated with the fuel passage through an oil guiding hole, the fuel enters the self-excited sweeping oscillating fuel injection nozzle from the oil guiding hole, and accelerates into the oscillating chamber after passing through the contracted opening, the contracted opening is connected with one end of the oscillating chamber, and the spout is connected with the other end of the oscillating chamber; and
two blocking bodies are symmetrically disposed in the oscillating chamber with a line connecting a central point of the contracted opening and a central point of the spout as an axis of symmetry, and the two blocking bodies separate the oscillating chamber into a fuel oscillating part located in the middle part and two fuel backflow parts distributed on both sides.

5. The central staged combustion chamber with self-excited sweeping oscillating fuel injection nozzles according to claim 1, wherein the self-excited sweeping oscillating fuel injection nozzle is a groove disposed on a surface of the oil guiding flange facing away from the direction of the incoming flow, the pilot stage is provided with a circular-ring-shaped first shutter, and the circular-ring-shaped first shutter is suitable for closing an opening of the groove facing away from the direction of the incoming flow.

6. The central staged combustion chamber with self-excited sweeping oscillating fuel injection nozzles according to claim 5, wherein the pilot stage comprises a pilot stage fuel injection device, and the pilot stage fuel injection device comprises a pilot stage fuel injection nozzle, a central swirler, and a fuel injection nozzle mounting ring used for connecting the pilot stage fuel injection nozzle to the middle part of the central swirler.

7. The central staged combustion chamber with self-excited sweeping oscillating fuel injection nozzles according to claim 6, wherein the pilot stage comprises a front-end swirling part, and the front-end swirling part comprises the first shutter, a boss located on a surface of the first shutter and facing the direction of the incoming flow, and a secondary swirler located on a surface of the boss and facing the direction of the incoming flow.

8. The central staged combustion chamber with self-excited sweeping oscillating fuel injection nozzles according to claim 7, wherein the pilot stage fuel injection device comprises a positioning face used for abutting with the secondary swirler, and the central swirler is disposed on a side of the positioning face away from the secondary swirler.

9. The central staged combustion chamber with self-excited sweeping oscillating fuel injection nozzles according to claim 1, further comprising: a second shutter used for closing an annular opening of the fuel passage facing the direction of the incoming flow; the second shutter is provided with a notch suitable for being connected with the oil pipeline, and the liquid fuel of the oil pipeline is suitable for entering the fuel passage through the notch.

\* \* \* \* \*